(12) United States Patent
Stephens et al.

(10) Patent No.: US 8,335,824 B2
(45) Date of Patent: Dec. 18, 2012

(54) METHODS, SYSTEMS, AND COMPUTER PROGRAM PRODUCTS FOR PROVIDING METADATA SUBSCRIPTION SERVICES

(75) Inventors: Todd Stephens, Sharpsburg, GA (US); Benjamin Jenkins, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1048 days.

(21) Appl. No.: 11/025,230

(22) Filed: Dec. 29, 2004

(65) Prior Publication Data
US 2006/0143275 A1   Jun. 29, 2006

(51) Int. Cl.
*G06F 15/16* (2006.01)
(52) U.S. Cl. ............... 709/206; 707/828; 707/829
(58) Field of Classification Search .......... 709/224–225, 709/206; 707/828–829
See application file for complete search history.

(56) References Cited

U.S. PATENT DOCUMENTS

| | | |
|---|---|---|
| 4,850,007 A | 7/1989 | Marino et al. |
| 5,652,784 A | 7/1997 | Blen et al. |
| 5,742,905 A | 4/1998 | Pepe et al. |
| 5,926,537 A | 7/1999 | Birze |
| 6,014,439 A | 1/2000 | Walker et al. |
| 6,018,577 A | 1/2000 | Roach, Jr. |
| 6,038,305 A | 3/2000 | McAllister et al. |
| 6,085,101 A | 7/2000 | Jain et al. |
| 6,088,440 A | 7/2000 | Millar et al. |
| 6,351,639 B1 | 2/2002 | Motohashi |
| 6,366,791 B1 | 4/2002 | Lin et al. |
| 6,385,308 B1 | 5/2002 | Cohen et al. |
| 6,404,880 B1 | 6/2002 | Stevens |
| 6,418,330 B1 | 7/2002 | Lee |
| 6,549,916 B1 * | 4/2003 | Sedlar ................................ 1/1 |
| 6,567,658 B1 | 5/2003 | Van De Graaf |
| 6,574,335 B1 | 6/2003 | Kalmanek, Jr. et al. |
| 6,603,844 B1 | 8/2003 | Chavez, Jr. et al. |
| 6,606,504 B1 | 8/2003 | Mooney et al. |
| 6,607,255 B2 | 8/2003 | Bond, III et al. |
| 6,608,891 B1 | 8/2003 | Pelletier et al. |
| 6,633,910 B1 * | 10/2003 | Rajan et al. ................... 709/224 |
| 6,665,390 B1 | 12/2003 | Ekstrom |
| 6,694,429 B1 | 2/2004 | Kalmanek, Jr. et al. |
| 6,778,648 B1 | 8/2004 | Alston et al. |
| 6,829,233 B1 | 12/2004 | Gilboy |
| 6,829,332 B2 | 12/2004 | Farris et al. |
| 6,856,673 B1 | 2/2005 | Banks et al. |
| 6,871,214 B2 * | 3/2005 | Parsons et al. ................ 709/206 |
| 6,874,011 B1 * | 3/2005 | Spielman et al. ............. 709/206 |
| 7,035,675 B2 | 4/2006 | Yamada |
| 7,062,257 B2 * | 6/2006 | Amin ............................ 455/413 |
| 7,072,983 B1 * | 7/2006 | Kanai et al. .................. 709/246 |
| 7,103,353 B2 * | 9/2006 | Suzuki ....................... 455/414.2 |
| 7,219,153 B1 * | 5/2007 | Day ............................. 709/229 |
| 7,328,364 B1 * | 2/2008 | Leong et al. ................. 714/6.22 |
| 7,565,643 B1 * | 7/2009 | Sweet et al. .................. 717/121 |
| 7,620,630 B2 * | 11/2009 | Lloyd et al. ........................ 1/1 |

(Continued)

*Primary Examiner* — Duyen Doan
(74) *Attorney, Agent, or Firm* — Cantor Colburn LLP

(57) ABSTRACT

Exemplary embodiments relate to methods, systems, user devices and computer program products for providing metadata subscription services. Methods include receiving notification that an item in a repository has been modified and determining if a notification is associated with the item being modified. The notification corresponds to an address and the determining is performed in an automated manner in response to the receiving. The notification is transmitted to the address in an automated manner in response to determining that the notification request is associated with the item being modified.

19 Claims, 3 Drawing Sheets

U.S. PATENT DOCUMENTS

| | | | |
|---|---|---|---|
| 7,668,535 B2 * | 2/2010 | Conneely et al. | 455/412.2 |
| 2002/0114437 A1 | 8/2002 | Nabkel et al. | |
| 2002/0131574 A1 | 9/2002 | Alleman | |
| 2002/0143932 A1 * | 10/2002 | Quintero et al. | 709/224 |
| 2002/0152262 A1 * | 10/2002 | Arkin et al. | 709/202 |
| 2003/0002657 A1 | 1/2003 | Seelig et al. | |
| 2003/0023690 A1 * | 1/2003 | Lohtia | 709/206 |
| 2003/0086558 A1 | 5/2003 | Seelig et al. | |
| 2003/0149526 A1 * | 8/2003 | Zhou et al. | 701/213 |
| 2003/0182383 A1 * | 9/2003 | He | 709/206 |
| 2004/0067751 A1 | 4/2004 | Vandermeijden et al. | |
| 2004/0078464 A1 * | 4/2004 | Rajan et al. | 709/224 |
| 2004/0210452 A1 * | 10/2004 | Aboujaoude et al. | 705/1 |
| 2005/0076098 A1 * | 4/2005 | Matsubara et al. | 709/219 |
| 2005/0114760 A1 * | 5/2005 | Arregui et al. | 715/513 |
| 2005/0132016 A1 * | 6/2005 | Boone | 709/207 |
| 2006/0023862 A1 | 2/2006 | Sutcliffe | |
| 2006/0026277 A1 | 2/2006 | Sutcliffe | |
| 2006/0047620 A1 * | 3/2006 | Branson et al. | 707/1 |
| 2006/0056628 A1 * | 3/2006 | Todd | 380/233 |
| 2006/0164324 A1 * | 7/2006 | Polivy et al. | 345/1.1 |
| 2006/0177044 A1 | 8/2006 | O'Neil et al. | |
| 2008/0201299 A1 * | 8/2008 | Lehikoinen et al. | 707/3 |
| 2009/0083314 A1 * | 3/2009 | Maim | 707/103 R |

* cited by examiner

METHODS, SYSTEMS, AND COMPUTER PROGRAM PRODUCTS FOR PROVIDING METADATA SUBSCRIPTION SERVICES

BACKGROUND OF THE INVENTION

Exemplary embodiments relate generally to repository contents, and more particularly, to methods, systems and computer program products for providing subscription services to provide notification when metadata in a repository is modified.

Metadata has traditionally been defined as "data about data" or "information about information" and may be thought of as information that classifies and/or describes an object. Metadata may describe data, information and/or knowledge. Today, with the advent of technologies such as hypermedia and heuristically based searching and indexing, a new, broader, more generic definition of metadata has been emerging. This definition includes the traditional concepts, but it adds the concepts of existence, perspective, modeling and topicality. The expanded definition recognizes that much, if not most, of enterprise data is not found in traditional relational database management systems (RDMS), but rather, it is found in the myriad technological assets and views of those assets that exist at any point in time. The expanded enterprise definition of metadata, as used herein, is as follows: metadata is structured, semi-structured and unstructured data that describes the characteristics of a resource (external source) or asset (internal source); metadata is about knowledge, which is the ability to turn information and data into effective action. Metadata may provide information such as where an asset/resource is located, what primitive elements make up the asset/resource and how the asset/resource was developed or created.

Enterprise architectures may define a universe where assets are created by the technical community in a variety of forms. An asset is any person, place or thing within a particular enterprise community (e.g., the technical community, and the customer service representative community). Examples of assets that may be included for a technical community include databases, logical models, physical model, extensible markup language (XML) structures, software components, documents, metrics, systems and interfaces. A resource is similar to an asset, with the exception that resources come from outside of the enterprise, or organization. Resources that may be included for a technical community include research services, web services and packaged models. Enterprise business intelligence (EBI) may be built upon this foundation of assets and resources.

Currently, notification that metadata about an item (e.g., an asset or resource) in a repository has been deleted, added, or modified is accomplished by a librarian sending an email from a list or posting the information on a site. The first method requires a librarian to keep an up-to-date list of interested parties for each item in a repository and to send an email to the parties on the list when the metadata has changed. The second method, posting to a site, is commonly referred to as a pull strategy which forces the user to come to the site without any notification. This second method may result in random delays in proliferating information into the enterprise.

SUMMARY OF THE INVENTION

Exemplary embodiments relate to methods, systems, user devices and computer program products for providing metadata subscription services. Methods include receiving notification that an item in a repository has been modified and determining if a notification is associated with the item being modified. The notification corresponds to an address and the determining is performed in an automated manner in response to the receiving. The notification is transmitted to the address in an automated manner in response to determining that the notification request is associated with the item being modified.

Systems for providing metadata subscription services include an input for receiving notification that an item in a repository has been modified. Systems also include at least one application for determining if a notification is associated with the item being modified. The notification corresponds to an address and the determining is performed in an automated manner in response to the receiving. The notification is transmitted to the address in an automated fashion in response to determining that the notification request is associated with the item being modified.

Computer program products for providing metadata subscription services include a storage medium readable by a processing circuit and storing instructions for execution by the processing circuit for facilitating a method. The method includes receiving notification that an item in a repository has been modified and determining if a notification is associated with the item being modified. The notification corresponds to an address and the determining is performed in an automated manner in response to the receiving. The notification is transmitted to the address in an automated manner in response to determining that the notification request is associated with the item being modified.

User devices include an input for receiving a notification that an item in a repository has been modified. The notification is transmitted to the user device in response to receiving a message that the item in the repository has been modified, and to determining that the notification corresponds to the item being modified and that the notification associated with the item corresponds to an address of the user device. The determining is performed in an automated manner in response to receiving the message. The transmitting is performed in an automated manner in response to the determining. The user devices also include an output for communicating the notification to a user via the user device.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In accordance with exemplary embodiments, metadata subscription services are provided. Exemplary embodiments provide an automatic notification of update when existing items (e.g., assets and resources) in a repository are modified or newly added. Providing automatic notification may lead to a decrease in the time required to implement new functionality. Exemplary embodiments may also provide the ability to drop off the individual artifacts that make up the item. For example, assume that an application utilizes XML to share data between two companies and that they share an XML schema. The ability to notify the other business unit of a related change and then to drop the new schema off in a designated location (e.g., via a drop box utility) may lead to a minimum amount of business disruption due to the changing schema. Typically, email and a designated drop off box utility will be utilized to notify subscribers to changes in the items. Exemplary embodiments also provide for notification via a pager, a telephone message (e.g., text and data), a cellular telephone and/or a web site bulletin board.

The technology environment may be thought of as a holistic view of all the resources and assets recognized within the technology community. There are no real boundaries to this definition other than that a resource should have universal organizational value and an asset should belong to the enterprise. Examples of assets/resources include database tables, code libraries, use cases, documentation, metric loads from local data stores, and any other items that can be described by metadata. Generally speaking, each asset should be housed within some form of a repository to ensure that the metadata information is accessible and can provide value throughout the life cycle of the asset.

Figure 1:
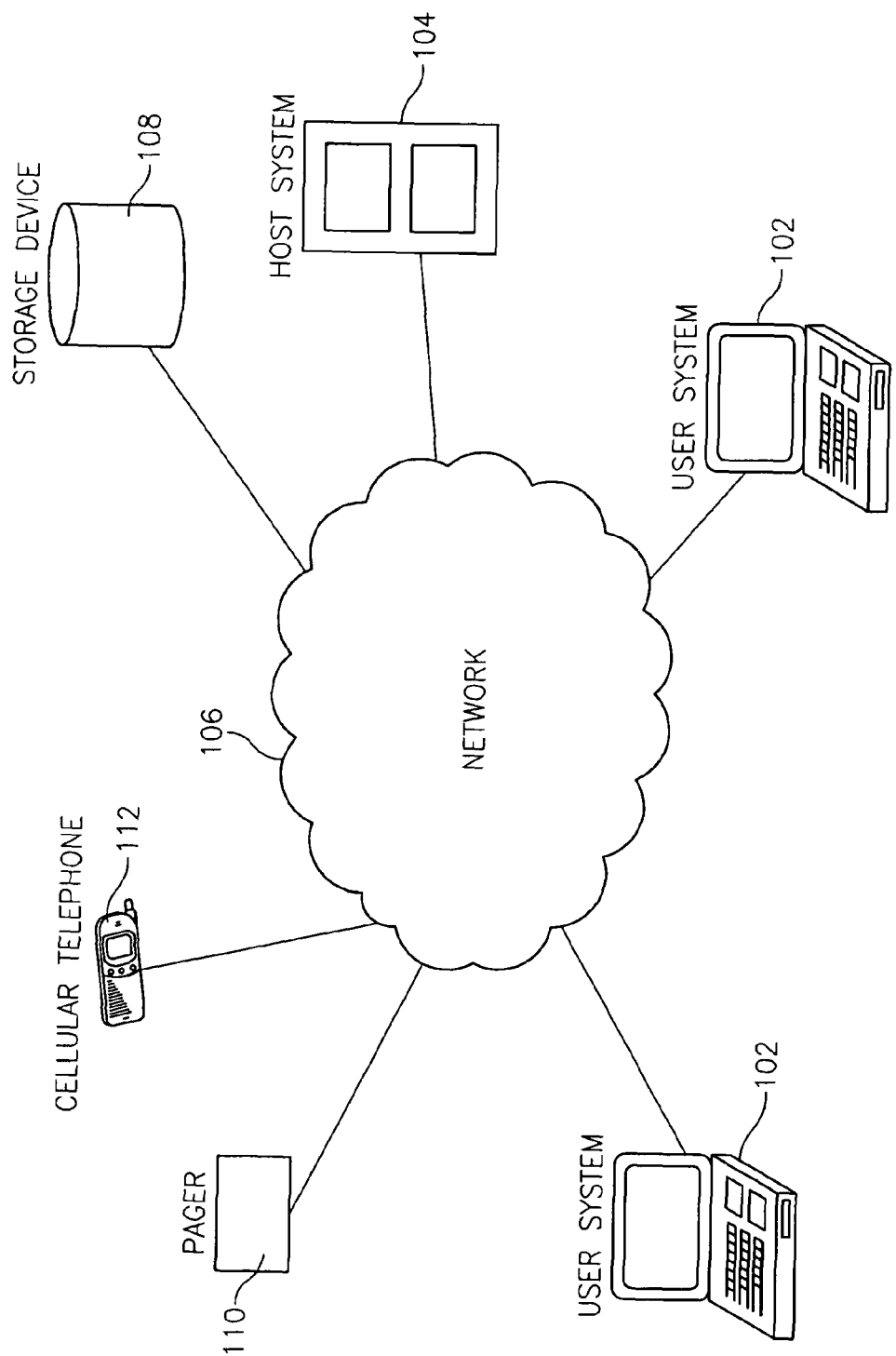
FIG. 1 is a block diagram of a system that may be utilized to provide metadata subscriptions services in accordance with exemplary embodiments.

FIG. 1 is a block diagram of a system that may be utilized to provide metadata subscriptions services in accordance with exemplary embodiments. The system includes one or more user systems 102 through which users at one or more geographic locations may contact the host system 104 to subscribe to a notification service and/or to receive a notification. In addition, notification may be received at an address corresponding to a pager 110, a cellular telephone 112, a web site bulletin board, or any other method for receiving information. In exemplary embodiments of the present invention, the host system 104 executes the program logic to set up subscriptions to the notification service and to notify a subscriber when items selected by the user have been modified. The user systems 102 (and other user devices for receiving information such as the pager 110 and the cellular telephone 112) are coupled to the host system 104 via a network 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102) or contained completely within one or more of the user systems 102.

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion.

The storage device 108 may be implemented using a variety of devices for storing electronic information. It is understood that the storage device 108 may be implemented using memory contained in the host system 104 or the user system 102 or it may be a separate physical device. The storage device 108 is logically addressable as a consolidated data source across a distributed environment that includes a network 106. Information stored in the storage device 108 may be retrieved and manipulated via the host system 104. The storage device 108 includes data such as the subscription and notification software, the repository metadata and the subscription data. In exemplary embodiments the repository is implemented using off the shelf repository systems such as Advantage Repository from Computer Associates, Rochade from AG Software Solutions, Metastage from Ascential Software and MetaCenter from Data Advantage Group. In addition, embodiments may be utilized with repositories that are built by and customized for particular customers and/or particular applications. The storage device 108 may also include other kinds of data such as information concerning the updating and creation of the subscriptions. In exemplary embodiments, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software.

The host system 104 may also operate as an application server. The host system 104 executes one or more computer programs to perform subscription and notification. Processing may be shared by the user system 102 and the host system 104 by providing an application (e.g., java applet) to the user system 102. Alternatively, the user system 102 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
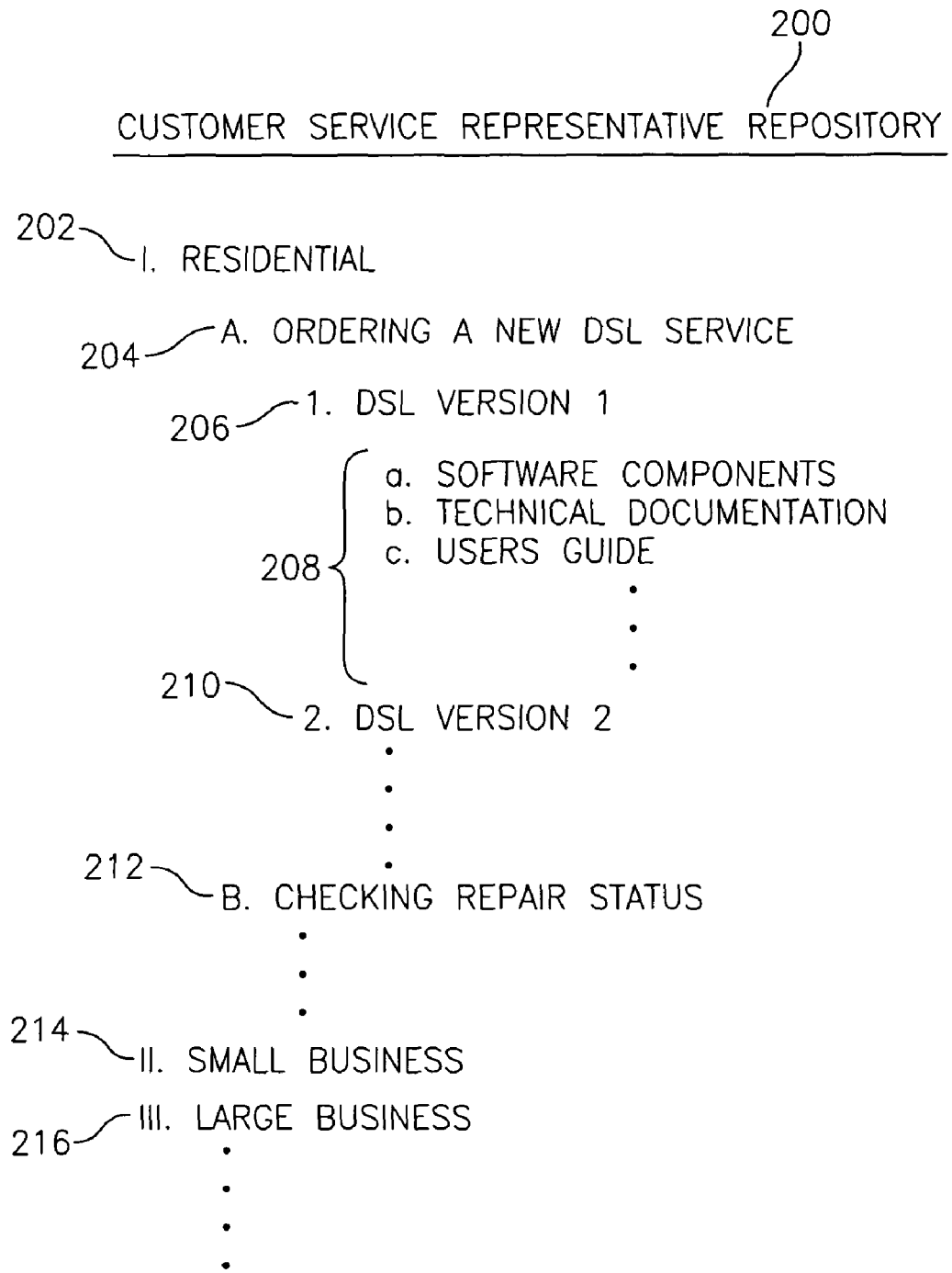
FIG. 2 is a block diagram of a sample repository that may be utilized in the implementation of providing metadata subscription services in exemplary embodiments.

FIG. 2 is a block diagram of a sample repository that may be utilized in the implementation of providing metadata subscription services in exemplary embodiments of the present invention. FIG. 2 includes the types of items that are stored in the example data repository. In exemplary embodiments of the present invention, the metadata about each item is stored in the storage device 108 and includes information such as update date, creation date and item location. The actual item may be stored in the storage device 108 or in another storage location that is accessible via the storage device 108. Typically, the types of items included in the repository, the relationships between the items and the types of metadata stored with each item are created and updated by a repository administrator.

The sample repository depicted in FIG. 2 is a customer service representative (CSR) repository 200 with data used by customer representatives when they are assisting customers.

The CSR repository 200 includes several types of items including topics, assets and artifacts; these items are specific to the CSR repository 200 and other types of items may be included in other repositories supported by exemplary embodiments of the present invention. The CSR repository 200 includes several topics denoted with roman numerals: a "residential" topic 202, a "small business" topic 214 and a "large business" topic 216. The CSR would utilize different topics depending on the type of customers that they support. One or more assets may be included within each topic. For example, assets in the "residential" topic 202 include: an "ordering a new digital subscriber line (DSL) service" asset 204 and a "checking repair status" asset 212. Each asset may also have one or more versions. For example asset versions in the "ordering a new DSL service" asset 204 include a "DSL version 1" asset version 206 and a "DSL version 2: asset version 210. Each asset version may include one or more artifacts and as depicted in FIG. 2, the "DSL version 1" asset version includes items such as software components, technical documentation and users guide artifacts 208.

The repository depicted in FIG. 2 is an example of a repository that may be utilized with exemplary embodiments of the present invention. The terminology used to describe items in the repository (e.g., topic and artifacts) is also exemplary in nature and other terminology may be utilized to describe items in a repository.

Figure 3:
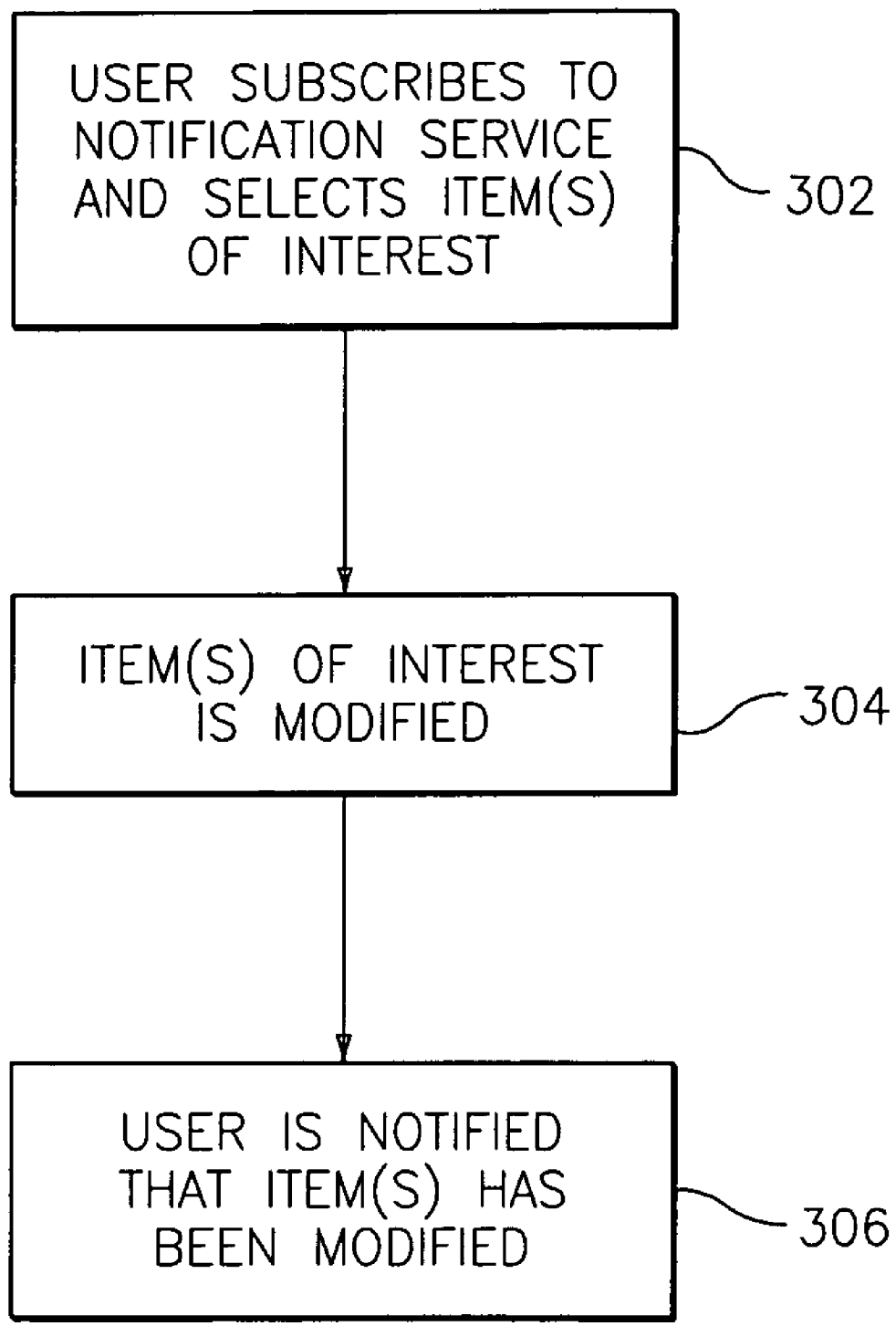
FIG. 3 is a flow diagram of a process for implementing providing metadata subscription services in exemplary embodiments.

FIG. 3 is a flow diagram of a process for implementing providing metadata subscription services in exemplary embodiments. At block 302, a user subscribes to a notification service and selects one or more items of interest from the repository 200. The user may utilize a user interface screen located on a user system 102 for displaying the layout of the repository 200. The user may then create a notification at any level in the repository 200 when an item has been added, an item has been deleted and/or when an item has changed. For example, the user may create a notification at the topic level and ask to be notified whenever a new topic is added, an existing topic is deleted, when metadata for an existing topic is modified and/or when any item below the topic level is modified. In another example, the user may create a notification at the asset version level and request to be notified when updates are performed to the "DSL version 1" asset version 206. The user may further specify that notification should occur when the metadata about "DSL version 1" asset version 206 is modified and/or when any of the artifacts 208 within the "DSL version 1" asset version 206 are added, deleted or modified and/or when metadata associated with the artifacts 208 are modified. As one skilled in the art would understand, any combination and granularity of specifying a notification may be implemented based on the layout of the repository 200.

In addition to creating a notification that an item in the repository has been modified (including updates to metadata associated with the item), exemplary embodiments also provide a copy of any updated or newly added artifacts (or any items at the lowest level of the hierarchy in the repository 200). The user may subscribe to this service as part of the notification service. In this manner, new information such as technical documents, users guides and software code may be distributed quickly to interested parties.

The data relating to individual subscribers including information such as notification requests and addresses to send notifications may be stored in any suitable manner that allows for easy lookup of the data. For example, the subscriber information may be stored in table format and located on the storage device 108. Alternatively, the subscriber information may be stored in an indexed relational database and accessed via the storage device.

At block 304 in FIG. 3, an item of interest in the repository 200 is modified. In exemplary embodiments, a message is received from the repository 200 that an item has been modified. The message may be created using off the shelf software. For example, Micrsoft Sharepoint provides a utility that creates a change management message when a document or artifact has been modified or checked back into the system. Here the repository is a document management system. In addition, network monitoring applications such as IPSentry and UniCenter from Computer Associates provide message creation plug-ins that create messages of application failure. When an item in the repository 200 is modified, the message is created and transmitted to the subscription service. The subscription service determines if any of the notifications set up by the user apply to the modification received in the message. This may be determined by accessing the table or database for information relating to the subscriptions and the items associated with the requested notifications. The determination is performed in an automated manner (i.e., by a computer without requiring human intervention) in response to receiving the message.

Block 306 is performed when at least one of the notifications in the subscriptions is related to the item being modified. A notification that describes the modification is transmitted to the address associated with each of the notifications associated with the modification of the item. If the user has also subscribed to the service that provides a copy of any updated or newly added artifacts (or any items at the lowest level of the hierarchy in the repository 200) for this item, then a copy will be transmitted to the address specified by the user. Both of the transmissions described above are performed in an automated manner by a computer without requiring human intervention to perform the transmission. The transmission occurs over any standard e-mail application. Messages may be created via the application and then can be sent along an e-mail infrastructure by using message based application programming interfaces (APIs). Messaging to pagers will utilize the same e-mail infrastructure with the exception of the pager company that will take the message from the e-mail infrastructure and place it on the pager infrastructure for final delivery. Exemplary embodiments of the present invention utilize Microsoft Office standard API development utilities.

While described herein with respect to a repository for customer service representatives in a telecommunications company, it will be understood by those skilled in the art that the metadata subscription services may be equally implemented in any environment that utilizes repositories for tracking data. For example, the repository may contain computer system components such as system design documents, users guides and software code for a variety of applications and application versions within the computer system. In addition, a user may be able to sign up for subscription services for more than one repository using exemplary embodiments.

As described above, the metadata subscription services provide an automated manner of notifying interested parties when an item in a repository has changed. This can result in an efficient and timely manner of distributing information to the individuals who rely on items located in a repository.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing metadata subscription services, comprising:
    receiving a notification subscription request containing an item selected from a plurality of items residing in a repository, the plurality of items stored in hierarchically-arranged levels within the repository;
    receiving a message that metadata of the item has been modified;
    determining that a notification is associated with the metadata of the item that has been modified based on a level of the hierarchically-arranged levels provided in the notification subscription request, wherein the notification corresponds to a first address and the determining is performed in an automated manner in response to the receiving;
    creating the notification for the notification subscription request, the notification including changes made with respect to the metadata associated with the item and any other items residing at a level of the item and any levels lower than the level of the item;
    transmitting the notification to the first address in the automated manner in response to determining that the notification is associated with the metadata of the item that has been modified; and
    automatically transmitting a copy of the item to a user specified second address in response to determining that the notification is associated with the metadata of the item that has been modified, the user specified second address is different than the first address;
    wherein a first level of the hierarchically-arranged levels specifies a type of customer, a second level of the hierarchical storage specifies a service, and the notification is created for the item corresponding to the service when the level of hierarchically-arranged levels provided in the notification subscription request specifies the second level.

2. The method of claim 1 further comprising creating the notification via a user interface screen on a user system.

3. The method of claim 1 wherein the notification is transmitted via an application programming interface.

4. The method of claim 1 further comprising transmitting a copy of the metadata to the user specified second address in response to determining that the notification is associated with the metadata of the item that has been modified.

5. The method of claim 1 wherein the first address specifies a telephone.

6. The method of claim 1 wherein the notification includes a voice message.

7. The method of claim 1 wherein modification of the item includes an addition of the metadata associated with the item.

8. A system for providing metadata subscription services, comprising:
    a host system in communication with a client system and a storage device over a network; and
    a notification application executing on the host system, the notification application performing:
    receiving a notification subscription request containing an item selected from a plurality of items residing in a repository of the storage device, the plurality of items stored in hierarchically-arranged levels within the repository;
    receiving a message that metadata of the item has been modified;
    determining that a notification is associated with the metadata of the item that has been modified based on a level of the hierarchically-arranged levels provided in the notification subscription request, wherein the notification corresponds to a first address and the determining is performed in an automated manner in response to the receiving;
    creating the notification for the notification subscription request, the notification including changes made with respect to the metadata associated with the item and any other items residing at a level of the item and any levels lower than the level of the item;
    transmitting the notification to the first address in the automated manner in response to determining that the notification is associated with the metadata of the item that has been modified; and
    automatically transmitting a copy of the item to a user specified second address in response to determining that the notification is associated with the metadata of the item that has been modified, the user specified second address is different than the first address;
    wherein a first level of the hierarchically-arranged levels specifies a type of customer, a second level of the hierarchical storage specifies a service, and the notification is created for the item corresponding to the service when the level of hierarchically-arranged levels provided in the notification subscription request specifies the second level.

9. The system of claim 8 wherein the notification is transmitted via an application programming interface.

10. The system of claim 8 wherein the notification application further performs transmitting a copy of the metadata to the second address in response to determining that the notification is associated with the metadata of the item that has been modified.

11. The system of claim 8 wherein the notification application further performs transmitting a copy of the item and the metadata to a third address in response to determining that the notification is associated with the metadata of the item that has been modified.

12. The system of claim 8 wherein the first address specifies a pager.

13. The system of claim 8 wherein a modification includes an addition of the metadata associated with the item.

14. A computer program product for providing metadata subscription services, the computer program product comprising a non-transitory storage medium readable by a processing circuit and storing instructions for execution by the processing circuit for facilitating a method comprising:

receiving a notification subscription request containing an item selected from a plurality of items residing in a repository, the plurality of items stored in hierarchically-arranged levels within the repository;

receiving a message that metadata of the item has been modified;

determining that a notification is associated with the metadata of the item that has been modified based on a level of the hierarchically-arranged levels provided in the notification subscription request, wherein the notification corresponds to a first address and the determining is performed in an automated manner in response to the receiving;

creating the notification for the notification subscription request, the notification including changes made with respect to the metadata associated with the item and any other items residing at a level of the item and any levels lower than the level of the item;

transmitting the notification to the first address in the automated manner in response to determining that the notification is associated with the metadata of the item that has been modified; and automatically transmitting a copy of the item to a user specified second address in response to determining that the notification is associated with the metadata of the item that has been modified, the user specified second address is different than the first address;

wherein a first level of the hierarchically-arranged levels specifies a type of customer a second level of the hierarchical storage specifies a service, and the notification is created for the item corresponding to the service when the level of hierarchically-arranged levels provided in the notification subscription request specifies the second level.

15. The computer program product of claim 14 wherein the method further comprises creating the notification via a user interface screen on a user system.

16. The computer program product of claim 14 wherein the method further comprises transmitting a copy of the metadata to the second address in response to determining that that notification is associated with the metadata of the item that has been modified.

17. The method of claim 1 further comprising storing the item and the metadata in a specified location in response to determining that the notification is associated with the metadata of the item that has been modified.

18. The method of claim 1, wherein:

the type of customer includes residential customers, small business customers, and large business customers;

the service is classified by a service order and a repair status; and a third level of the hierarchically-arranged levels is classified by a version of the service.

19. The system of claim 8, wherein the plurality of items are classified in the repository by type, asset, and artifact; and wherein the artifact includes software components, technical documentation, and users guides.

* * * * *